Patented Nov. 27, 1951

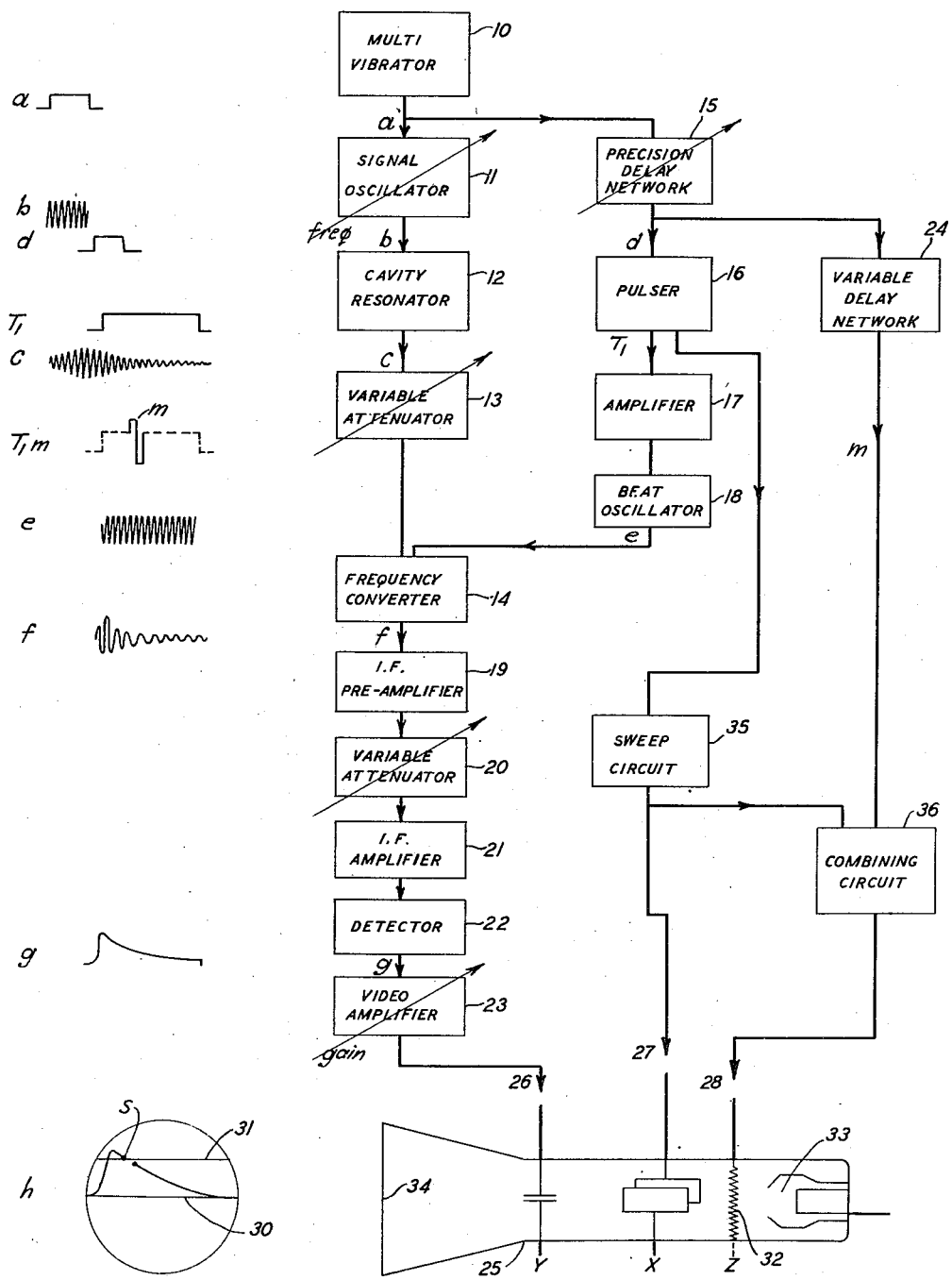

2,576,257

UNITED STATES PATENT OFFICE 2,576,257

MEASUREMENT OF Q OF RESONANT
ELECTRICAL SYSTEMS

Russell W. Lange, Chatham, N. J., assignor to
Bell Telephone Laboratories, Incorporated,
New York, N. Y., a corporation of New York Application January 27, 1948, Serial No. 4,624

5 Claims. (Cl. 175—183)

This invention relates to methods and apparatus for measurement of the quality factor Q of resonant electrical systems. The invention is of considerable importance in the measurement of the resonant properties of electrically conducting chambers of the type commonly known as resonant cavities.

The selectivity and the persistence of oscillation of a resonant electrical system depend chiefly upon the relation between the energy storage property of the system and its energy dissipation characteristic. A customary index of this relationship is the quality factor Q. The quality factor Q of any form of vibratory or oscillatory system which has been energized by a source of oscillations and thereafter disassociated from the source to permit the stored energy to be dissipated by waning vibration or oscillation may be defined by $$Q = 2\pi \frac{\text{total energy stored in the system}}{\text{energy dissipated per cycle}} \quad (1)$$

In the case of electrical systems having lumped or concentrated reactances and resistances, the expression for Q is that of the equivalent simple series resonant circuit, namely, $$Q = \frac{X}{R} \quad (2)$$

where X is the magnitude of the series capacitive or inductive reactance and R is the total series resistance. Various methods of measuring Q of such resonant systems are known. All of them measure a loaded or working value of Q which is a function both of the theoretical or unloaded Q and of the impedances of the associated devices coupled to the resonant system under measurement. In order that the measured Q be representative of the actual characteristics of the system under measurement it is important that the measuring system be so designed that the voltage and current relationships existing in the circuits coupled to the system under measurement are carefully determined and controlled. This necessitates control of the associated impedances for all methods of measurement of Q.

Among the various methods and systems for measurement of Q two are of considerable interest. One known as the band width method depends upon measurement of the frequency of oscillation at the maximum intensity or electrical resonance condition and measurement of the frequency at some other condition as, for example, that for which the intensity is .707 of its maximum value. This method is applicable to all forms of four terminal electrical networks which permit ready separation of the input and output circuits and, for relatively low values of Q and of the frequency, is fairly accurate.

If $\Delta_v$ be the ratio between the initial and final value of the envelope of the decaying oscillation amplitude in decibels during an interval $\Delta_t$ measured in seconds, $f$ the resonance frequency in cycles per second, then, $$Q = 27.3 f \frac{\Delta_t}{\Delta_v} \quad (3)$$

Equation 3 is the basis of a second method of measurement of Q known as the decrement method. In this method the resonance frequency and the time interval during which a measured diminution of the decaying oscillation takes place must be ascertained.

Equation 3 is readily derived as follows from the decaying current $i$ of a simple tuned circuit which has been excited and then isolated from other systems and which is given as $$i = -\frac{E_0}{L\omega} \epsilon^{-at} \sin \omega t \quad (4)$$

by G. W. Pierce, "Electric Oscillations and Electric Waves," McGraw-Hill Book Co., Inc., 1920, page 23, wherein the resonant circuit comprises a resistance R, and inductance L, and a capacitance C, in series, $E_0$ is the voltage across the capacitance at the time when $t$ equals zero, $\omega$ is the angular frequency, $2\pi f$, of undamped oscillation in the circuit in the limiting condition of no resistance, $a$ is the ratio of R to 2L, and $\epsilon$ is the base of natural logarithms. The quantity Q by Equation 2 is expressible as $$Q = \frac{\omega L}{R} \quad (5)$$

from which it follows that $$a = \frac{\omega}{2Q} \quad (6)$$

Substituting from (6) into (4)

$$i = -\frac{E_0}{L\omega} \epsilon^{-\frac{\omega t}{2Q}} \sin \omega t \quad (7)$$

The values of the envelope of the current $i$ at the beginning and end respectively of the interval $\Delta_t$ are, from (7), seen to be in the ratio $r$, where $$r = \epsilon^{\frac{\omega \Delta_t}{2Q}} \quad (8)$$

and $\Delta_v$, being in decibels, is given by $$\Delta_v = 20 \log_{10} \epsilon^{\frac{\omega \Delta_t}{2Q}}$$

$$= 20 \times \frac{\omega \Delta_t}{2Q} \times \log_{10} \epsilon$$

$$= 20 \pi \frac{f}{Q} \Delta_t (.434) = 27.3 \frac{f}{Q} \Delta_t \quad (9)$$

from which $$Q = 27.3 f (\Delta_t / \Delta_v) \quad (10)$$

which is the same as (3), thereby completing the required derivation of Q.

In accordance with the present invention an improved decrement method which is dependent upon the relationship of Equation 3 is utilized to measure the Q of a resonant chamber. The frequency $f$ of the exciting source readily may be measured to a high degree of accuracy by well-known heterodyne methods. The exciting source is first coupled to the resonant system and thereafter effectively disassociated from it. After the exciting source has been disassociated, measurements are made of the oscillation field intensity within the resonant chamber at times separated by an interval $\Delta_t$ long enough to occasion a decrease $\Delta_v$ in oscillation amplitude of the order of 20 decibels. These measurements may be effected with a high order of accuracy.

The drawing is a functional block diagram of one embodiment of the invention in a system for measuring the quality factor of electrically resonant apparatus such as cavity resonators. To facilitate explanation of the nature and functions of the various apparatus units comprising the system, graphs portraying current outputs plotted as ordinates with time as abscissae are associated by small letters with the output paths of the units to which they pertain.

Referring to the drawing a multivibrator 10 which may be of the free running type which continues in operation without external stimulus and sets its own pulse recurrence frequency may provide square topped pulses $a$ of the order of ten microseconds in length and of a recurrence frequency of the order of 1,500 cycles per second. In the system illustrated the unidirectional impulses $a$ are to be used partly for control of a source of microwaves of a constant frequency. It is desirable that the impulses be flat topped and that they have very steep leading and trailing edges with particular attention being given to the steepness of the trailing edge. A circuit description of a multivibrator adapted for this purpose is presented in my article entitled "Measurement of high Q cavities at 10,000 megacycles" appearing in the Transactions of the American Institute of Electrical Engineers, volume 66, pages 161–167.

The unidirectional pulses supplied by the output path of multivibrator 10 are impressed on signal oscillator 11 which may be of any type that is a highly stable microwave oscillator which is capable of being pulsed (or frequency modulated). The microwaves $b$ which may, for example, be of the order of 3,000 to 25,000 megacycles per second, occur in trains of substantially the same duration as the unidirectional pulses by which they are produced. It transpires therefore that the signal oscillator will impress upon the cavity resonator 12 to which its output is connected a train of microwaves of the resonance frequency of the cavity resonator. For that purpose the signal oscillator 11 is preferably provided with manual or electrical means for varying its frequency to attain the resonance frequency of the resonator. With the cessation of unidirectional pulse $a$, the train $b$ of microwaves ceases and excitation of the resonator 12 is terminated. The resonator field builds up during the period of excitation to a maximum magnitude and after the excitation ceases the field wanes at a rate dependent upon the intrinsic Q of the resonator and upon the nature of the associated circuits which serve to act as loads upon it. It would be desirable, were it completely feasible, to reduce all loading effect exerted upon the resonator by the associated signal oscillator 11 during the decay period of the electric field. However, the fundamentally important consideration is to set and maintain as constant as possible during the measuring interval the coupled impedance or the loading effect which the oscillator presents and to this end the transmission path connecting the output of oscillator 11 to the input of resonator 12 may be made electrically rather long thus maintaining the conjoint impedance of the transmission path and the connected signal oscillator reasonably constant as viewed from the coupling point of the resonator. Under these circumstances the intensity of the internal field of the resonator will rise during the exciting interval and then fall away exponentially as indicated by graph $c$.

It was explained at the outset that the measurement of the quality factor of an electrical resonance system in accordance with the present invention depends upon the relationship between the measured intensities of the decaying field of the resonance system at two instants separated by a known time interval. It remains therefore to show how the intensity of the field $c$ is measured at two known instants.

The measurement of field intensity is effected by a superheterodyne radio receiving system which connects the output of the cavity resonator 12 to the Y or vertical trace deflector plates of a cathode ray oscilloscope indicated diagrammatically at 25. The energy of the decaying field $c$ is impressed by an output transmission path connecting resonator 12 to the input of a variable attenuator 13 which may insure that the resulting oscillations in the attenuator output are supplied at an appropriate intensity level to the frequency converter 14 to which the attenuator is connected.

In order to reduce the frequency of the decaying oscillations, these oscillations are caused to interact in a frequency conversion system including the frequency converter 14 with beating oscillations $e$ supplied by a local beating oscillator 18. These beating oscillations are not continuously supplied to converter 14 but are preferably pulsed on at some instant just following the cessation of the exciting train $b$. Suitable forms of the signal oscillator 11 and beat oscillator 18 are suggested in my aforementioned article. A precision delay network 15 connected to the output of multivibrator 10 receives unidirectional pulse $a$ therefrom. This network serves to generate a new pulse $d$ in an exact timed relation to the trailing edge of pulse $a$. The network 15 is made variable so that pulse $d$ may be made to occur at whatever time after the cessation of pulse $a$ may be found desirable. Apparatus for performing functions of this sort is well known and one such device for producing delayed pulses and for manually varying the delay at will is disclosed by Meacham in his United States Patent 2,422,204.

The output of the delay network 15 is applied to the input of pulser 16 which may preferably be a slave multivibrator which follows the control pulse $d$ to yield suitable control pulses at positions such as $T_1$ which depend upon the amount of delay introduced by the delay network 15. After amplification by amplifier 17 the control pulses $T_1$ from pulser 16 are impressed on beat oscillator 18 to cause it to apply a train of beating oscillations $e$ to the frequency converter 14 to interact with oscillations $c$ from the cavity resonator. The frequency of the beating oscillations produced by source 18 may differ from those of the signal oscillator 11 by an intermediate frequency of the order of 60 megacycles. The use of relatively narrow band intermediate frequency transmission circuits will tend to improve the signal to noise ratio. It will be apparent that since measurements are only to be made after excitation of the resonator 12 has ceased there is no occasion to apply beating oscillations to the converter until about the time that a measurement is to be made. Consequently the delay introduced by the precision delay network 15 should be such as to cause impulse $T_1$ and the beat frequency oscillation train $e$ to commence after the exciting oscillation train $b$ has ceased. The delay network may be calibrated in microseconds to indicate the interval between the trailing edge of impulse $a$ and the beginning of the impulse $T_1$ produced by pulser 16. Like the signal oscillator 11 the beat frequency oscillator 18 may be of any highly stable microwave oscillator type which is capable of being pulsed or frequency modulated in a clean-out and effective manner.

The frequency converter 14 may preferably be of the well known silicon crystal type disclosed in the article "Microwave Converters" by C. F. Edwards in Proceedings of I. R. E., November 1947. It is desirable to operate the device of a linear frequency converter, i. e., one in which the amplitude of the intermediate frequency output signal varies linearly with the amplitude of the ultra-high frequency input signal. For this purpose the ratio of the voltage of the beating oscillations from beat source 18 to the voltage of the signal oscillations from the cavity resonator as applied to the crystal converter is made large. This condition may be facilitated by the use of the attenuator 13 in the signal channel. Also, attenuator 13 may be used to confirm the linear operation of the converter.

In order to maintain the resulting intermediate frequency oscillations $f$ sufficiently above noise level an intermediate frequency "pre-amplifier" 19 is connected between the converter 14 and a variable attenuator 20. An intermediate frequency amplifier 21 and a detector 22 connected in tandem receive the intermediate frequency oscillations at a level set by the adjustment of attenuator 20 and yield an envelope $g$ which may be applied as indicated at 26 to the vertically deflecting or Y plates of oscilloscope 25 after amplification by so-called video amplifier 23 (see F. E. Terman's "Radio Engineer's Handbook," Mc-Graw-Hill, 1943, pages 413–434) to shift the oscilloscope trace in a vertical direction in accordance with the intensity of the decaying field $c$.

The oscilloscope 25 may also be provided with the customary X or horizontally deflecting plates and sweep circuit 35 to sweep the trace horizontally as a function of time. Such sweep circuits are well known and it is customary in the art to begin the sweep at an instant such as to present as large a part of the phenomena as possible in graphic form. Accordingly, it will be sufficient to note that the sweep circuit derives its initiating pulse in the well-known manner from the output of pulser 16 leading to point 27 so that the time of application of the sweep voltage is coordinated with the initiation of beat frequency oscillations.

The oscilloscope screen may be provided with arbitrary reference lines 30 and 31 in any well-known manner. For substantially increased accuracy in comparison of the detected intermediate frequency signals, a brightly illuminated spot followed by a break or blanking in the oscillograph trace or graph $h$ may be used. To provide such a spot the potential of the intensity control grid 32 is modulated through the combining circuit 36 with a second and more complex unblanking electromotive force $m$ derived from the delay network 24. The combining circuit may be an apparatus having a linear electrical characteristic. One type of such combining device and of each of the various other components of the apparatus disclosed herein is presented in my aforementioned article entitled "Measurement of high Q cavities at 10,000 megacycles."

The oscillograph is constructed with an intensity control grid 32 to which the Z or intensity control electromotive forces may be applied. As in normal practice the Z potential is maintained so negative that the cathode beam from electron gun 33 is inhibited. At the time that the sweep voltage is applied to the horizontally deflecting plates an unblanking voltage derived from the sweep circuit 35 and the output of the variable delay network 24 is applied through the combining circuit 36 at 28 to the intensity control grid 32 to override its normal negative blanking potential and permit the cathode beam to pass thus producing an illuminated trace $h$ on the screen 34. This unblanking electromotive force may have substantially the form of the impulse $T_1$ so that for its duration the potential of the grid 32 rises to permit the cathode beam to pass and at the termination of the impulse the beam is again "blanked" to terminate the trace. It will, accordingly, be understood that the oscilloscope 25 will portray the intensity of the intermediate frequency signal by means of an illuminated trace or graph $h$ in which ordinates indicate the Y or vertical deflecting electromotive force derived from detection of the intermediate frequency signal and abscissae the X or horizontal sweep deflecting electromotive force corresponding to the time ensuing since initiation of the sweep voltage. It should, of course, be recalled that the graph $h$ does not correspond to the envelope of the decaying field $c$ over its entire period of decay but on the contrary presents a picture of the intensity of the intermediate frequency signal over a brief interval beginning at about the instant that the beat frequency oscillations are initiated.

The intermediate frequency oscillations as has already been stated are produced by interaction of the decaying signal oscillations $c$ and the very much stronger local beating oscillations $e$. Consequently the graph $h$ will have a rapidly rising leading edge in spite of the fact that the oscillations $c$ are falling away in value since the oscillations $e$ from the beating oscillator are building up very rapidly to their constant magnitude. As soon as the beating oscillations reach constant magnitude the resultant intermediate frequency oscillations will begin to wane because of the decay of the signal oscillation factor.

In order to secure a very definite point in the graph $h$ for measuring purposes a time instant is selected which falls just beyond the maximum ordinate of $h$ but as near it as will give a clean-cut reading. A variable delay network 24 is connected to the output of the precision delay network 15 to produce a very brief marking pulse $m$ which comprises a square topped positive portion followed immediately by a very sharp transition from a positive to a negative value and then a square topped negative portion with an abrupt return to zero. In actual practice pulse *a* may be of the order of 10 microseconds, pulse $T_1$ of the order of 10 microseconds depending upon the size of the screen 34 and other mechanical and electrical factors and the pulse *m* may be much shorter as indicated. The production of the pulse *m* may be accomplished with well known expedients for effecting wave transmission delay, impulse differentiation and shaping as described in the range indicating and wave transmission art including the Meacham Patent 2,422,204, June 17, 1947, and Terman, Radio Engineering, McGraw-Hill, third edition, chapter 12. The delay network 24 is manually set to place the marking pulse *m* just beyond the maximum ordinate of *h* but as near it as will give a clean-cut reading and at the proper point in the sweep of the oscilloscope. Accordingly, as soon as the oscilloscope is unblanked the trace *h* appears. Upon initiation of pulse *m* the trace is brightened for a brief interval or instant corresponding to the positive portion which aids the unblanking pulse and serves to intensify the cathode beam. Immediately thereafter the negative portion of pulse *m* occurs and momentarily blanks the trace thus producing an exceedingly sharply defined bright spot S followed by a break in the trace which gives a definite time mark.

The strength or intensity of the intermediate frequency oscillations at two separate instants may be compared by use of the oscilloscope. The measurement at the earlier time may be made with precision delay network 15 set to introduce a minimum of delay that will enable measurement following the cessation of the exciting oscillations *b*. At that time the attenuator 20 will be set to introduce a relatively large attenuation which may be varied until the bright spot S produced by the positive portion of the marking pulse *m* is nicely positioned on the horizontal line 31. Since most precision attenuators of the type used have discrete attenuation steps it is necessary when using such devices to provide a vernier adjustment to align S on 31. This vernier action can be secured first by changing the delay network 15 a small measurable amount or second by changing, within small limits, the gain introduced by the variable amplifier 23. The readings of the setting of attenuator 20 and precision delay network 15 are carefully noted. The precision delay network 15 is then reset to introduce a large delay to cause the pulser impulse to occur at some later instant at which the field *c* may have become attenuated some 20 decibels from its magnitude at the earlier measurement. Ranges from 10 decibels to 40 decibels have proved satisfactory depending upon circumstances. From the readings of the setting of the precision delay network at the measuring instants one can directly obtain the time interval between them which will represent the quantity $\Delta_t$ of Equation 3. It remains to compare the magnitude of the intermediate frequency oscillations at the first measuring instant with the magnitude of those at the later reading. Since the resetting of the precision delay network the fixed timing spot and the sweep circuit pulse producer and the unblanking pulse producer automatically occur together with the resetting of the beating oscillator, their initial effects are still properly correlated. Accordingly, the oscilloscope will now present a trace which will correspond to the greatly attenuated condition of oscillations *f* at the later time. By noting the attenuation required to cause spot S to again coincide with the horizontal line one may ascertain the change in intensity which is an index of the magnitude of the variation $\Delta_v$ of Equation 3. Having $\Delta_t$ and $\Delta_v$ it is now a simple matter to calculate Q.

The system may be used either by selecting an arbitrary $\Delta_t$ and setting the delay accordingly, and noting the necessary $\Delta_v$ to bring the fixed bright timing spot on to the line or by selecting an arbitrary $\Delta_v$, setting the attenuator to that value and shifting the delay until the fixed bright timing spot is properly aligned. In either procedure it is advisable to use relatively wide ranges of delay and of attenuation.

Although in the diagram the resonator under study is indicated as having separate input and output paths the method and system of the invention is obviously applicable to resonators of the type having a single coupling device.

What is claimed is:

1. The method of measuring the selectivity of a resonant chamber which comprises impressing thereon a pulse of oscillations of a known frequency at which the chamber has a natural mode of oscillation, measuring the relative amplitudes of the oscillatory field therein at two instants subsequent to termination of the pulse and separated by a time interval sufficient to permit an attenuation of at least 10 decibels in the field strength and measuring the length of said time interval.

2. The method of measuring Q of a resonant chamber which comprises energizing the chamber by oscillations of frequency *f* of one of its natural modes of oscillation, terminating the energization, measuring the time interval $\Delta_t$ between two instants such that the decrease $\Delta_v$ in field strength occurring during the interval is of the order of 20 decibels, and measuring the decrease $\Delta_v$ in field strength expressed in decibels whereby Q is readily attainable from the equation $$Q = 27.3 f \frac{\Delta_t}{\Delta_v}$$

3. A system for measuring the quality factor Q of an electrical resonance device which comprises a source of oscillations of a natural resonance frequency of the device, an oscillation detector, a local beating oscillation generator of an oscillation frequency different from that of said source, means for connecting said device to said source to receive pulses of oscillations therefrom and said detector to said device to receive oscillations from said device, means for connecting said generator to said detector to impress beating oscillations thereon, a pulsing means connected to said source and to said beating oscillation generator to initiate and terminate pulses of oscillations transmitted from said source to said device and to initiate pulses of beating oscillations to be supplied by said generator to said detector at instants subsequent to the termination of a pulse from said source and separated by a measured time interval, and means connected to said detector to receive the resulting responses therefrom and to indicate the intensities thereof.

4. Apparatus for measuring the quality factor Q of an electrical resonance device which comprises in combination, a source of signal oscillations of a natural resonance frequency of the device, an oscillation detector, a local beating oscillation generator of an oscillation frequency different from that of said source, means for connecting said device to said source to receive signal oscillations therefrom and said detector to said device to receive oscillations from said device, means for connecting said generator to said detector to impress beating oscillations thereon, a first pulsing means connected to said source to initiate and terminate pulses of signal oscillations transmitted from said source to said device, a second pulsing means of the same repetition rate as said first pulsing means and connected to said generator to initiate and terminate pulses of beating oscillations supplied to said detector, adjustable precision delay means responsive to pulses from said first pulsing means to control the initiation of said beating oscillation pulses at instants separated by a measured time interval and subsequent to the termination of said signal oscillation pulses, and an indicating device connected to said detector to receive the resulting detected responses therefrom and to said second pulsing means to indicate said pulse intensities at said time separated instants.

5. The combination in accordance with claim 4 in which said indicating device comprises a cathode-ray oscilloscope.

RUSSELL W. LANGE.

REFERENCES CITED

The following references are of record in the file of this patent:

UNITED STATES PATENTS

| Number | Name | Date |
|---|---|---|
| 2,457,673 | Hershberger | Dec. 28, 1948 |
| 2,475,179 | Eltgroth | July 5, 1949 |

OTHER REFERENCES

Dumont Oscillographer, vol. 7, No. 2, March-April 1945, pages 1-4.